July 8, 1924.

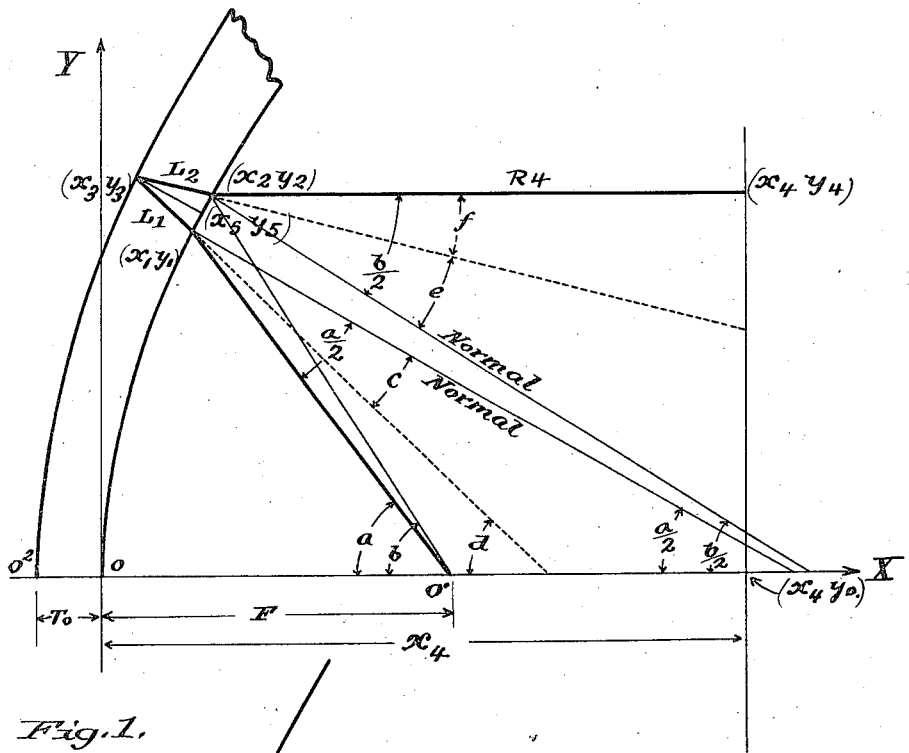
Fig. 1.
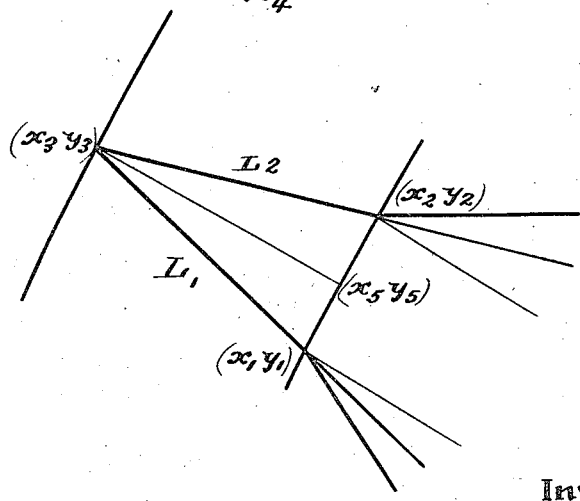
Inventor
Frank A. Benford,
by [signature]
His Attorney.

F. A. BENFORD

GLASS MIRROR

Filed July 22, 1922

Inventor:
Frank A. Benford
by
His Attorney

July 8, 1924.
F. A. BENFORD
GLASS MIRROR
Filed July 22, 1922
1,501,031
3 Sheets-Sheet 3
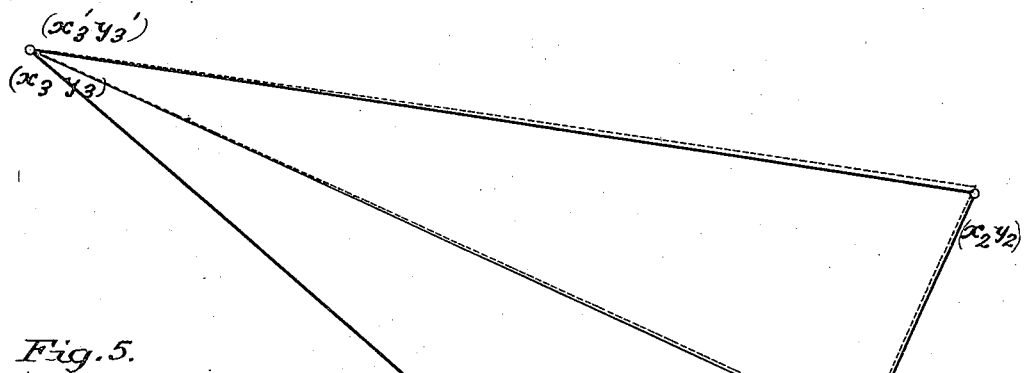
Fig. 5.
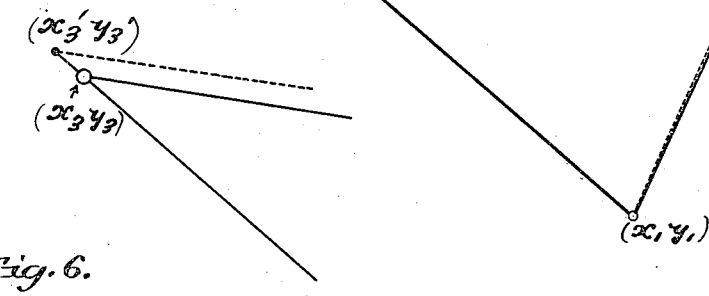
Fig. 6.
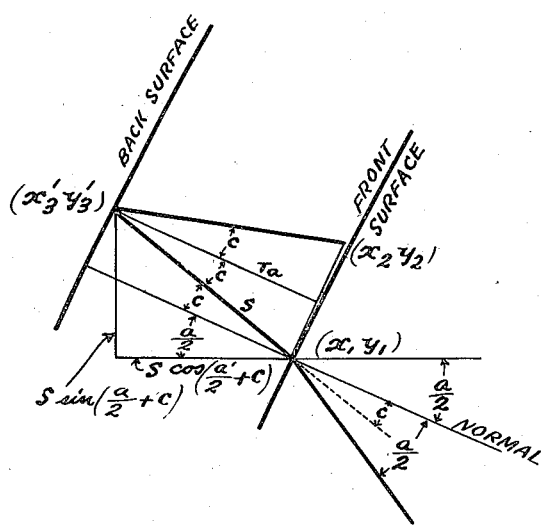
Inventor
Frank A. Benford,
by *Albert G. Davis*
His Attorney Patented July 8, 1924.

1,501,031

UNITED STATES PATENT OFFICE.

FRANK A. BENFORD, OF SCHENECTADY, NEW YORK, ASSIGNOR TO GENERAL ELECTRIC COMPANY, A CORPORATION OF NEW YORK.

GLASS MIRROR.

Application filed July 22, 1922. Serial No. 576,686.

*To all whom it may concern:*

Be it known that I, FRANK A. BENFORD, a citizen of the United States, residing at Schenectady, in the county of Schenectady, State of New York, have invented certain new and useful Improvements in Glass Mirrors, of which the following is a specification.

My invention has reference to mirrors in general. More in particular, it has reference to mirrors that are used as reflectors for searchlights or in connection with apparatus such as moving picture machines, headlights and the like. Furthermore, my invention has special reference to mirrors of the paraboloidal type. In practice, it is found that a glass paraboloidal mirror, in a searchlight for example, gives two beams, one from the front surface of the mirror and one from the back or silvered surface. The former beam carries, roughly speaking, only five per cent of the total intensity of the light, while the beam from the back surface carries the remainder of the light, or about ninety-five per cent. It is found in practice that these two beams do not coincide. It is one of the objects of my invention to make a mirror that will cause these two beams to coincide in order to produce a more efficient light and a beam of greater sharpness. If a mirror is used in which the front surface is a paraboloidal surface, I find that the second or silvered surface must be so formed as to compensate for the angles of refraction of the light which is reflected from the silvered surface. This refraction takes place at two points, namely—at the point where the light enters the glass, and the point where the light leaves the glass after having been reflected from the back or silvered surface. I find that such a back surface is not parallel to the front surface, nor is it paraboloidal in form. It does, however, approximate the paraboloidal form.

Another object of my invention is to provide other details of improvement tending to increase the efficiency and serviceability of mirrors of the above character.

It is a matter of considerable difficulty and a matter of considerable labor to determine the rear surface of mirrors of the above character and I shall proceed now to describe how such surfaces are obtained in the accompanying specifications, reference being made to the accompanying drawings.

Referring specifically to the drawings, Fig. 1 represents an axial section of the mirror constructed in accordance with my invention. In this figure, I also show enlarged the diagram of the course of the rays of light which originate at the focal point and which are reflected by the mirror.

Figure 2:
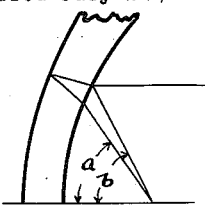
Fig. 2 is a curve showing the relation between the angle $b-a$ and the angle $a$ of Fig. 1.
Figure 4:
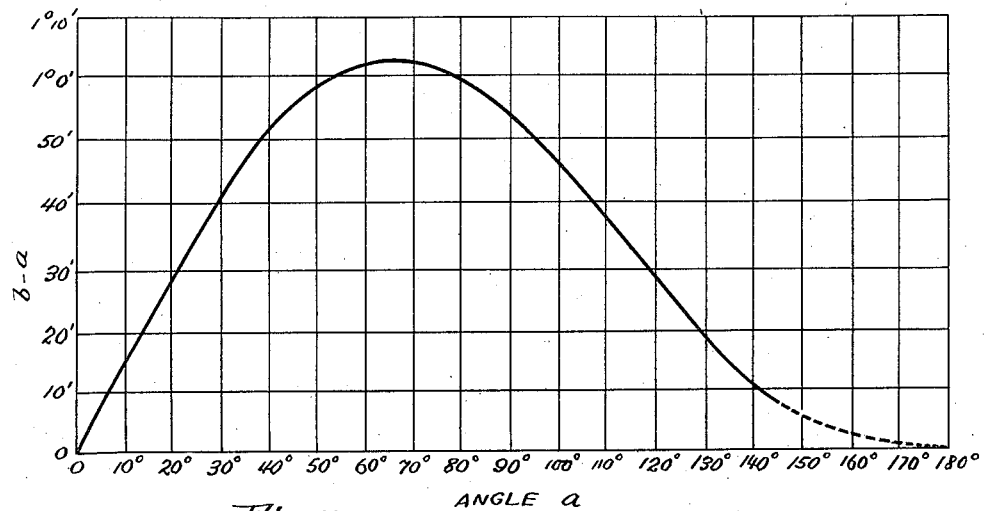
Fig. 4 is a curve showing the relation between the thickness of the mirror along the $x$-axis and the angle $$\frac{a+b}{2}$$

of Fig. 1.

In Fig. 5, a diagrammatic comparison is made between two different methods of solution on a scale of 20 to 1. Also an enlargement of a section of the diagram on a 1000 to 1 scale.

Fig. 6 illustrates the triangle method of solution.

I will now refer more in detail to the drawings in connection with which I will make use of a series of symbols. The following is a tabulation and description of these symbols:

$F$ = focal length of the paraboloidal front surface. The common method of making $F=1$ will be followed so that F becomes the unit of measure and disappears from the equations.

$T_0$ = the thickness of the glass on the axis of projection, i. e., along the $x$-axis.

$T_a$ = the thickness of the glass at some other angle $a$ from the axis of projection.

$n$ = the refractive index of the glass as compared with that of air taken as unity. In this computation $n=1.52$.

$(X_1 Y_1)$ = the rectangular coordinates of a point on the paraboloidal front surface, referred to the vertex of this surface as origin of coordinates. This point $(X_1 Y_1)$ is taken as the point of entrance of the ray leaving the focal point at the angle $a$.

$(X_2Y_2)$ = the rectangular coordinates of the point at which the ray through $(X_1Y_1)$ emerges from the glass.

$(X_3Y_3)$ = the rectangular coordinates of the point at which the ray through $(X_1Y_1)$ is reflected by the silvered back surface of the mirror.

$(X_4Y_4)$ = a point in a plane placed perpendicularly to the axis of projection at a distant $X_4$ from the origin.

$(X_5Y_5)$ = the point where the bisector of the ray path in the glass intercepts the front surface of the mirror.

$a$ = angle between the incident ray through the point $(X_1Y_1)$ and the $x$-axis.

$\frac{a}{2}$ = angle between the incident ray and the normal to surface at point $(X_1Y_1)$.

$b$ = angle between the radius vector from focal point to the point of emergence $(X_2Y_2)$ and $x$-axis.

$\frac{b}{2}$ = angle between the emergent ray and the normal to front surface at point $(X_2Y_2)$.

$c$ = angle between normal to front surface at point $(X_1Y_1)$ and the path of the refracted ray through the glass.

$d$ = angle between the path of the refracted ray at the point $(X_1Y_1)$ and the $x$-axis.

$e$ = angle between the normal to the front surface at the point $(X_2Y_2)$ and the path of the emerging ray through the glass.

$f$ = angle between the paths of the ray through the point $(X_2Y_2)$ before and after refraction.

$p$ = length of radius vector, measured from focal point.

The familiar optical rules relating object, radius of curvature, and image do not readily apply to the problem in hand. The curvature of the mirror decreases rapidly as we move out from the axis so that any investigation starting with radius of curvature must necessarily soon become quite involved. There is one method of attack that is rather simple and while a considerable amount of labor is involved in carrying it out, the results are certain and exact. This is the method of equal optical paths or "equal times", and is here used in determining points on the second or back surface.

Two methods of computing the desired back surface will be given. One is the above mentioned of equal paths and the second we will call the triangle method, to be later described. The first method will be used as a standard to which solutions by another method herein described, will be referred.

Let us consider a point source of light placed at the focus of the first surface, Fig. 1, to give off a single pulse of light. This pulse will advance in all directions in a spherical wave until it reaches the mirror. One section of the wave, which we may call a ray, moves along the $x$-axis, meets the front surface of the glass at O and passes into the glass, reaching the back or silvered surface at the point $O_2$. At this point the ray is reflected back along the same axis and reaches the plane $X_4$ at the point $(x_4y^0)$. As pointed out, the path from $O_1$ to $O_2$ and back to the plane $X_4$ along the $x$-axis is partly in air and partly in glass. We know that the rate of travel of light through glass is $n$ times more slow than in air. Therefore, the distance $L_0$ that the ray would travel in the same time through air is obviously $$L_0 = F + 2nT_0 + x_4 \quad (1)$$

We know that if the light is reflected by the front surface the reflected rays will all be parallel to the $x$-axis inasmuch as the curve of the front surface is paraboloidal. The condition set for our reflector is that the two beams shall coincide and therefore emerging ray at the point $(x_2y_2)$ must also run parallel to the $x$-axis. This condition will be fulfilled when all rays that leave the focal point and that are reflected by the back surface, take the same time to reach the plane $X_4$. This means that the distance "$L$" that any one of the rays travels from the focal point to the back surface and to the plane $X_4$ shall be $$L = L_0 \quad (1_a)$$

The next step is to find the itemized statement of "$L$" similar to that of $L_0$ in equation 1, and equate the two itemized statements.

The general method of procedure for this step is outlined below—

1. Choose any ray making some angle $a$ with the $x$-axis and find its point of intersection $(X_1Y_1)$ with the front surface.

2. Trace the path of this ray into the glass from the point of entrance $(x_1y_1)$ to the point of reflection $(x_3y_3)$ and find the equation of the straight line $L_1$, representing this path, which is as yet of an unknown length.

3. Select some point $(x_2y_2)$ on the front surface at which it is graphically or otherwise estimated, as a first approximation, that the ray will emerge and move parallel to the $x$-axis.

4. Trace the path of this ray into the glass from the point $(x_2y_2)$ and backward through the glass to the point of reflection $(x_3y_3)$ and find the equation of this straight line path designated as $L_2$ and which is as yet of an unknown length.

5. Find the intersection of the two paths $L_1$ and $L_2$ as a trial point for the point of reflection $(x_3y_3)$ on the back surface.

6. Find the total length $(L_1+L_2)$ of that portion of the path of the ray confined within the glass, and substitute in the itemized statement of L, noting whether the path thus obtained by trial is too short or too long to satisfy the equation of equal paths.

7. Repeat operations 3, 4, 5 and 6 until the equation of equal paths is satisfied with the desired exactness.

The foregoing having been set out preliminarily, we will now proceed with the operation of ascertaining the items for the length of path L (equation 2) in order to equate with the itemized statement in equation 1.

Consider the ray that enters the glass at point $(x_1y_1)$. This ray is reflected at the point $(x_3y_3)$ and emerges again at the point $(x_2y_2)$ striking the plane $X_4$ at the point $(x_4y_4)$. From the focus to the point $(x_1y_1)$, the optical path is $F+x_1$ which follows from the usual definition of a parabola as being the locus of a point equally distant from a fixed point and a fixed line. Denoting by $L_1$ the actual distance between points $(x_1y_1)$ and $(x_3y_3)$ and by $L_2$ the distance between $(x_3y_3)$ and $(x_2y_2)$, the equivalent length in air of this optical path through the glass is $n(L_1+L_2)$. After the second refraction at the point $(x_2y_2)$ the path to the plane $X_4$ is $(x_4-x_2)$. Adding the separate items of the path we get $$L=F+x_1+n(L_1+L_2)+(x_4-x_2) \quad (2)$$

but (1) and (2) are to be equal, hence $$F+2nT_0+x_4=F+x_1+n(L_1+L_2)+x_4-x_2$$

or $$2nT_0=n(L_1+L_2)+x_1-x_2 \quad (3)$$

When equation 3 is satisfied for all points on the back surface, then the reflected beam will be a bundle of parallel rays, parallel to the $x$-axis and the two surfaces will fulfill the condition previously outlined.

In the following equations, both rectangular and polar coordinates are used as is most convenient in any particular step. The expression for a right section of the paraboloidal front surface is in rectilinear coordinates having the vertex of the curve as origin—

$$y^2_1=4x_1 \quad (4)$$

the focal length F being taken as unity. The polar form of expression for the same curve is $$P=\frac{1}{\cos^2\frac{a}{2}} \quad (5)$$

Where P is the radius vector, or distance from the focus to a point on the curve.

Selecting some convenient angle $a$, we have $$y_1=2\tan\frac{a}{2} \quad (6)$$

and $$x_1=\frac{y^2_1}{4} \quad (7)$$

The angular relation between the incident and refracted ray at $(x_1y_1)$ is $$\sin\frac{a}{2}=n\sin c \quad (8)$$

The angle $d$ of the refracted ray is $$d=\frac{a}{2}+c \quad (9)$$

and the equation of the line passing through $(x_1y_1)$ and $(x_3y_3)$ may be written immediately $$y_1=-x_1\tan d+C_1 \quad (10)$$

leaving only $C_1$ to be determined by substituting numerical values of $x_1y_1$ and $\tan d$ in the equation.

This is as far as the work can be carried by a direct process for the position and direction of the reflected ray $L_2$ cannot be directly determined without knowing in advance the point of reflection $(x_3y_3)$. The next step is to estimate the location of the point $(x_2y_2)$ on the front surface at which the ray through $(x_1y_1)$ is going to emerge. In computation of this sort the accuracy of the result is usually required to be as great as possible using a seven place table of logarithms, which in this particular work will give an error of one part in about one hundred thousand. It is thus evident that an estimate of the emerging point $(x_2y_2)$ will give highly inaccurate data, but such data may be used as a basis for a second, third, etc., estimate that will gradually approach exactness.

Having selected some point $(x_2y_2)$ as worthy of trial, the ray is traced backward through the glass to find the crossing point $(x_3y_3)$ with the path through $(x_1y_1)$.

To determine the angle between the normal at $(x_2y_2)$ and the emergent ray, we have $$2\tan\frac{b}{2}=y_2 \quad (11)$$

and the angle between the path $L_2$ in the glass and the normal is determined by $$n\sin e=\sin\frac{b}{2} \quad (12)$$

and the angle $f$ between the path $L_2$ and the ray leaving $(x_2y_2)$ parallel to the axis is $$f=\frac{b}{2}-e \quad (13)$$

also $$x_2=\frac{y^2_2}{4}$$

and the equation of the line of the path $L_2$ is $$y_2 = -x_2 \tan f + C_2 \quad (14)$$

where $C_2$ may be readily found from the numerical values of $(x_2 y_2)$ and $\tan f$.

The crossing point $(x_3 y_3)$ of the lines of equations (10) and (14) may be determined for its $x_3$ value by solving $$x_3 = \frac{C_1 - C_2}{\tan f - \tan d} \quad (15)$$

The actual length of the path $L_1$ between $(x_1 y_1)$ and $(x_3 y_3)$ is $$L_1 = \frac{x_1 - x_3}{\cos d} \quad (16)$$

and the length of $L_2$ is $$L_2 = \frac{x_2 - x_3}{\cos f} \quad (17)$$

We are now in possession of all data necessary for a trial solution of equation (3). If the right hand member of (3) exceeds $2nT_0$ in value, we select a smaller value of $y_2$ for the next trial, or, if the path is too short, we take a greater value and repeat the operation indicated by equations (11) to (17).

In checking the design of a mirror that is finished one of the simplest ways is to measure the thickness from front to back surface at various points. This is easily done with great exactness on a broken mirror for then small micrometers reading to 0.0001 inclusive may be used.

It should be pointed out that in using micrometers the line of measurement is not normal to either of the non-parallel surfaces, but it is the least distance between a given point on one surface and the other surface. To get this line of least thickness by a method of computation would be a lengthy process and the extra work would not be justified by the small gain in accuracy.

The computations so far made by means of equations (1) to (17) give not only the location of a point $(x_3 y_3)$ on the back surface, but they give the normal to the surface at that point. This normal, which is the bisector of the angle between $L_1$ and $L_2$, has the equation $$y_3 = -x_3 \tan \frac{d+f}{2} + C_3 \quad (18)$$
$$= -m x_3 + C_3$$

where $$m = \tan \frac{d+f}{2} \quad (19)$$

The intersection of this normal with the parabolic front curve is obtained by solving $$x_5 = \frac{C_3 m + 2 - 2\sqrt{1 + C_3 m}}{m^2} \quad (20)$$

and $$y_5 = \frac{-2 - 2\sqrt{1 + C_3 m}}{m} \quad (21)$$

the thickness of glass is $$T_a = \frac{x_5 - x_3}{\cos \frac{d+f}{2}} \quad (22)$$

or $$T_a = \frac{y_3 - y_5}{\sin \frac{d+f}{2}} \quad (23)$$

Equation (22) is the more accurate for points within 60 degrees of the axis; beyond this point (23) is the better.

It has been found that operation (11) to (17) must be repeated from four to six times to arrive at a fairly exact value for $(x_3 y_3)$. Here lies the objection to this method. Each point $(x_3 y_3)$ determined on the back surface requires some 400 operations with seven place logarithms for the solution of equations (6) to (10) once each and (11) to (17) about five times each. If it is the purpose of the designer to make a templet of the back surface it may be necessary to solve for a point every half inch along its length. For a 60 inch diameter mirror, this would mean 60 solutions, or about 24,000 operations with seven place logarithms. The cost of such a series of computation is in many cases prohibitive. To overcome this difficulty a direct method of solution has been developed. This method, while derived from certain optical laws, is empirical in nature and the question of its accuracy immediately arises. This method, which is outlined below, has been checked against the exact method in a number of ways and found to give data of sufficient accuracy for the manufacturer to work to.

Figure 3:
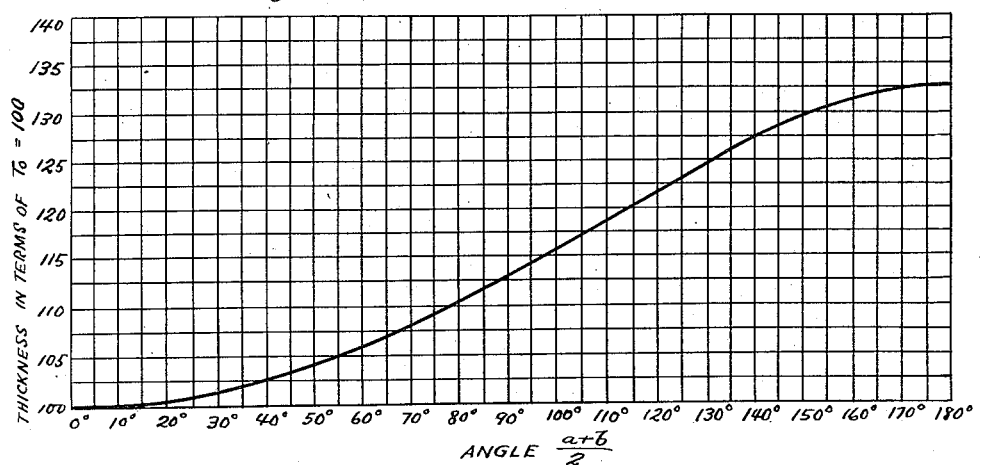
Fig. 3 illustrates the thickness of the mirror at the limiting angle of 180 degrees.
Figure 3:
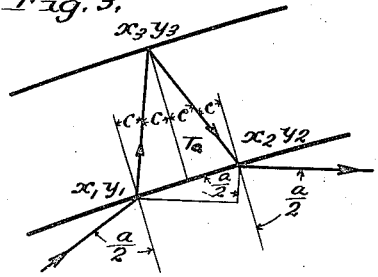

Let us assume that a mirror is built with a great depth along the axis of projection, so that the two branches of the generating parabola become nearly parallel to the axis. The light from the focal point will strike the surface at the distant edge in a direction close to the grazing angle, and after refraction, reflection and a second refraction the light will travel parallel to the axis without much change of direction. Fig. 3 represents roughly the condition at the edge of a very deep reflector when the generating angle $a$ approaches the limit 180 degrees.

The altitude of the triangle (Fig. 3) formed by the points $(x_1 y_1)$, $(x_2 y_2)$, $(x_3 y_3)$ is nearly equal to the thickness of the glass because the curvature between $(x_1 y_1)$ and $(x_2 y_2)$ is small and the difference between the curve and a straight line is not great.

Measuring from $(x_1 y_1)$ to $(x_3 y_3)$, the optical length of path is $$L_1 = \frac{nT_a}{\cos c} \quad (24)$$

and also the triangle being isosceles, $$L_2 = \frac{nT_a}{\cos c} \quad (25)$$

The base of the triangle has a length $$B = 2T \tan c \quad (26)$$

and from the construction of the figure it is evident that $$x_2 - x_1 = 2T \tan c \sin \tfrac{1}{2}a \quad (27)$$

Substituting these values in equation (3)

$$2nT_0 = \frac{2T_a}{\cos c}(n - \sin c \sin \tfrac{1}{2}a) \quad (28)$$

but $$\sin \tfrac{1}{2}a = n \sin c \quad (29)$$

and equation (28) becomes $$2nT_0 = \frac{2T_a}{\cos c}(n - n \sin^2 c)$$
$$= \frac{2nT_a}{\cos c} \cos^2 c \quad (30)$$
$$= 2nT_a \cos c$$

or, rearranging, $$T_a = \frac{T_0}{\cos c} \quad (31)$$

The angle $c$ has a maximum value (the "critical angle"), and $\cos c$ thus has a minimum, which establishes a maximum thickness for the glass at the theoretical limit of $a = 180°$. Equation (31) is true at $a = 0$, reducing to the identity $$T = T_0 \quad (32)$$

Equation (31) although developed solely as a limiting case, is fortunately a very good approximation at all points between $a=0$ and $a=180°$, as is shown in the tabulation below. The calculations are based on the angle $a$ at which the ray enters the glass, and equation (31) may be rewritten in a slightly more convenient form by changing from angle $c$ to angle $\tfrac{1}{2}a$ $$T_a = \frac{T_0}{\sqrt{1 - \left(\frac{\sin \tfrac{1}{2}a}{n}\right)^2}} \quad (33)$$

$$X_3 = F \tan^2 \tfrac{1}{2}a - \frac{T_0}{1 - \left(\frac{\sin \tfrac{1}{2}a}{n}\right)^2}\left(\cos \tfrac{1}{2}a \sqrt{1 - \left(\frac{\sin \tfrac{1}{2}a}{n}\right)^2} - \frac{1}{n}\sin^2 \tfrac{1}{2}a\right) \quad (43)$$

$$Y_3 = 2F \tan \tfrac{1}{2}a + \frac{T_0}{1 - \left(\frac{\sin \tfrac{1}{2}a}{n}\right)^2}\left(\sin \tfrac{1}{2}a \sqrt{1 - \left(\frac{\sin \tfrac{1}{2}a}{n}\right)^2} + \frac{1}{2n}\sin a\right)$$

*Thickness of mirror.*

| Point of incidence at— | $\frac{a+b}{2}$ | Thickness from length of bisector. (1) | Thickness from (31) or (33) (2) | (2)−(1) |
|---|---|---|---|---|
| 0° | 0 | 0.0382369 | 0.0382369 | 0 |
| 10° | 10° 7′25.56″ | 0.0383008 | 0.0383026 | +0.0000018 |
| 20° | 20°14′25.52″ | 0.0384841 | 0.0384889 | +0.0000048 |
| 30° | 30°20′35.93″ | 0.0388066 | 0.0388036 | −0.0000030 |
| 40° | 40°25′36.00″ | 0.0392488 | 0.0392433 | −0.0000055 |
| 50° | 50°29′ 9.40″ | 0.0398120 | 0.0398065 | −0.0000055 |
| 60° | 60°31′ 5.64″ | 0.0404973 | 0.0404903 | −0.0000070 |
| 80° | 80°29′58.67″ | 0.0422006 | 0.0421956 | −0.0000050 |
| 100° | 100°23′13.77″ | 0.0442701 | 0.0442702 | +0.0000001 |
| 120° | 120°13′41.42″ | 0.0465200 | 0.0465273 | +0.0000073 |
| 140° | 140° 5′13.485″ | 0.0486418 | 0.0486474 | +0.0000056 |
| 180° | 180° | 0.0507720 | 0.0507720 | 0 |

*Parametric equations for points on back surface.*

The triangle of equation (31) may be used to locate $(x_3 y_3)$ with a degree of accuracy that is surprisingly good. Referring to Fig. 6, we can write $$S = \frac{T}{\cos c} \quad (34)$$

for, according to construction the bisection T is parallel to the normal at $a°$ on the surface. Substituting $T_0$ for T, from (31)

$$S = \frac{T_0}{\cos^2 c} \quad (35)$$

Again referring to Fig. 6, it is evident that $$\begin{matrix} x_1 - x'_3 = S \cos (\tfrac{1}{2}a + c) \\ y'_3 - y_1 = S \sin (\tfrac{1}{2}a + c) \end{matrix} \quad (36)$$

where $(x'_3 y'_3)$ is the $(x_3 y_3)$ point as determined by the "triangle" method.

In equation (36) we may substitute from the following relations in order to eliminate $x_1 y_1$ and $c$ and have only the parameter $a$ (or $\tfrac{1}{2}a$) and the constants F and $T_0$ $$\sin c = \frac{\sin \tfrac{1}{2}a}{n} \quad (37)$$

$$\cos c = \sqrt{1 - \left(\frac{\sin \tfrac{1}{2}a}{n}\right)^2} \quad (38)$$

$$\sin (\tfrac{1}{2}a + c) = \sin \tfrac{1}{2}a \cos c + \sin c \cos \tfrac{1}{2}a \quad (39)$$

$$\cos (\tfrac{1}{2}a + c) = \cos \tfrac{1}{2}a \cos c - \sin \tfrac{1}{2}a \sin c \quad (40)$$

$$x_1 = F \tan^2 \tfrac{1}{2}a \quad (41)$$

$$y_1 = 2F \tan \tfrac{1}{2}a \quad (42)$$

Making the above substitutions, the equation (36) may be written

The solution of (43) is considerably simpler than the solution of the path equation (3), not only because a single solution is much shorter, but because only one solution is required in place of four or five trials by the equal path method.

The tabulation below gives a number of values for $(x_3 y_3)$ and $(x'_3 y'_3)$, showing an excellent agreement between the two methods.

| | $X_3$ | $X'_3$ | $Y_3$ | $Y'_3$ |
|---|---|---|---|---|
| 0° | −0.0382369 | −0.0382369 | 0 | 0 |
| 10° | −0.0303077 | −0.0303082 | 0.1805068 | 0.1805067 |
| 20° | −0.0060410 | −0.0060443 | 0.3636953 | 0.3636700 |
| 30° | +0.0360576 | +0.0360518 | 0.5524151 | 0.5524181 |
| 40° | +0.0987078 | +0.0986974 | 0.7498718 | 0.7498786 |
| 50° | +0.1862497 | +0.1862354 | 0.9598681 | 0.9598809 |
| 60° | +0.3053371 | +0.3053198 | 1.1871401 | 1.1871602 |

In Fig. 5 a section of the mirror at 50° is shown enlarged twenty times, with two triangles showing the solution by equal paths (full lines) and the triangle method (dotted lines). From the figure it is seen that the triangle gives 1. Direction of entering ray correctly.
2. Location of apex of triangle fairly exactly.
3. Height of triangle nearly equal to length of bisector.
4. Reflected ray from $x'_3 y'_3$ in error by about 1°.
5. Refracted ray in error by 1° 30′.

The method is thus not suited for tracing a ray completely through the glass, or for finding the slope of the back surface, but these two features are not of great importance in the practical design of a mirror.

To complete the solution, it is necessary to find the point on the front surface to which the solutions of (33) and (43) apply. This point may be determined by getting the intersection of the front parabola by a line parallel to the normal at angle $a$. It will be noted that this does not quite agree with the bisector used in the original solution. This disagreement is not a serious matter, as it has small effect on the calculated value of $T_a$.

The line through $(x'_3\ y'_3)$ has for its equation $$y'_3 = -x'_3 \tan \tfrac{1}{2}a + C_5 \quad (44)$$

where only $C_5$ remains to be evaluated.

Equations (18) and (20) are then used, but instead of (19) we have $$M = - \tan \tfrac{1}{2}a \quad (45)$$

Although I have illustrated my invention in connection with a reflector, the front surface of which is paraboloidal in form, I wish it understood that my invention is not confined to a paraboloidal type of reflector but applies as well to other forms such as an ellipsoidal and hyperboloidal and the like.

In the foregoing, I have first described the direct method, that is, the equal path method and have used it as a check upon two approximation methods, namely, the triangle method and the limiting values method. The direct method may also be called the exact method. The approximation methods therefore may be used in making the reflector of my invention since the maximum error when either approximation method is used falls within a small fraction of 1 per cent of the result when the exact method is used as indicated by the table in page 13.

What I claim as new and desire to secure by Letters Patent of the United States, is:

1. A glass reflector having a rear surface and having a paraboloidal front surface, the former so located with reference to the front surface and of such configuration that the thickness of the glass as measured along any line normal to the rear surface is substantially $$T_a = \frac{T_0}{\cos c}$$

where $a$ is any angle.

2. A glass reflector having a rear surface and a curved front surface, the latter having a major axis and a focal point therein, the back surface so located with reference to the front surface and of such configuration that the thickness of the glass as measured along a line normal to the rear surface is substantially $$T_a = \frac{T_e}{\cos c}$$

where $a$ is any angle and where $c$ is the angle made by the line of refraction of a ray of light from the focal point of the front surface and where the ray enters the glass at the point where the normal is erected and where $T_0$ is the thickness of the glass along the measured axis.

3. A glass reflector having a rear surface and having a paraboloidal front surface, the former so located with reference to the front surface and of such configuration that the thickness of the glass as measured along a bisector of an angle formed by the refracted incident ray in the glass and the same ray as a reflected ray from the rear surface is $$T_a = \frac{x_5 - x_3}{\cos \frac{d-f}{2}}$$

where $a$ is any angle.

4. A glass reflector having a rear surface and having a paraboloidal front surface, the former so located with reference to the front surface and of such configuration that the thickness of the glass as measured along a line normal to the front surface is substantially $$T_a = \frac{T_0}{\cos c}$$

where said line makes any angle with the major axis.

5. A glass reflector having a rear surface and having a paraboloidal front surface, the former so located with reference to the latter and of such configuration that the thickness of the glass as measured along any line normal to the front surface and piercing the back surface at the point of reflection, is substantially $$T_a = \frac{T_0}{\cos c}$$

where $c$ is the angle between the direction of a refracted ray incident from the focal point of the front surface and a normal line to the front surface at the point where said incident ray strikes the front surface and where $T_0$ is the thickness of the glass along the major axis and where $a$ is the angle of the said incident ray with the major axis.

6. A glass reflector having a rear surface and a curved front surface, the latter having a major axis and a focal point therein, the back surface so located with reference to the front surface and of such configuration that the thickness of the glass as measured along any line normal to the front surface and piercing the back surface at the point of reflection is substantially $$T_a = \frac{T_0}{\cos c}$$

where $c$ is the angle between the direction of a refracted ray incident from the focal point of the front surface, and a normal line to the front surface at a point where said incident ray strikes the front surface and where $T_0$ is the thickness of the glass along the major axis and where $a$ is the angle of the incident ray with the major axis.

7. A glass reflector having a rear reflecting surface and a front paraboloidal surface, the former so located with reference to the front surface that a ray radiated from the focus and at any angle $a$ from the major axis is reflected at the rear surface at a point in a line normal to the front surface and at a distance from said front surface along said line represented by the equation $$T_a = \frac{T_0}{\cos c}.$$

8. A concavo-convex glass reflector having a paraboloidal front surface and a rear reflecting surface of revolution, the thickness of the glass between the two surfaces measured along any line perpendicular to the front surface being within 1 per cent of the thickness necessary to reflect every ray incident from the focal point of the front surface in a direction parallel to the major axis of the front surface.

9. A concavo-convex glass reflector having a paraboloidal front surface and a rear reflecting surface of revolution, the thickness of the glass between the two surfaces measured along any line perpendicular to the front surface being within .01 per cent of the thickness necessary to reflect every ray incident from the focal point of the front surface in a direction parallel to the major axis of the front surface.

10. A concavo-convex glass reflector having a paraboloidal front surface and a rear reflecting surface of revolution, the thickness of the glass between the two surfaces measured along any line perpendicular to the front surface being within .002 per cent of the thickness necessary to reflect every ray incident from the focal point of the front surface in a direction parallel to the major axis of the front surface.

11. A glass reflector having a rear surface and a front surface, the front surface being a conic and the rear surface being non-conic, the thickness of the glass between the two surfaces measured along any line normal to the front surface being substantially $$T_a = \frac{T_0}{\cos c}.$$

In witness whereof, I have hereunto set my hand this 20th day of July, 1922.

FRANK A. BENFORD.